United States Patent [19]

Bodrero

[11] 4,232,898
[45] Nov. 11, 1980

[54] CONFORMABLE SEATBACK COVER

[76] Inventor: Alberta Bodrero, 276 W. 6th North, Logan, Utah 84321

[21] Appl. No.: 934,413

[22] Filed: Aug. 17, 1978

Related U.S. Application Data

[63] Continuation of Ser. No. 806,178, Jun. 13, 1977, abandoned.

[51] Int. Cl.³ ............................................. A47C 31/10
[52] U.S. Cl. .................................... 297/219; 297/224
[58] Field of Search ............... 297/224, 219, 225, 227, 297/220, 229; 5/345 B

[56] References Cited

U.S. PATENT DOCUMENTS

| 1,748,743 | 2/1930 | Wedler | 297/224 |
| 1,820,104 | 8/1931 | Whaley | 297/224 |
| 1,889,662 | 11/1932 | Hyman | 297/224 |
| 2,229,160 | 1/1941 | Wittcoff | 297/224 |
| 2,497,698 | 2/1950 | Struble et al. | 297/220 |
| 2,513,582 | 7/1950 | Nattenheimer | 5/345 B |
| 3,208,794 | 9/1965 | Gunn | 297/219 |
| 3,892,440 | 7/1975 | Dudley et al. | 297/229 |

Primary Examiner—Francis K. Zugel
Attorney, Agent, or Firm—Thorpe, North & Gold

[57] ABSTRACT

A conformable seatback cover adapted for ease in installation while retaining a professionally fitted appearance, and constructed of heavy, non-stretchable material. The conformable structure of the cover is developed by prestructured front and back panels which correspond generally in dimensions to the front and back surfaces of a vehicle seatback, the tight fitting appearance being accomplished by the use of stretchable side panels which join the respective front and back surfaces in a snug fit to said seatback.

3 Claims, 4 Drawing Figures

U.S. Patent    Nov. 11, 1980    4,232,898
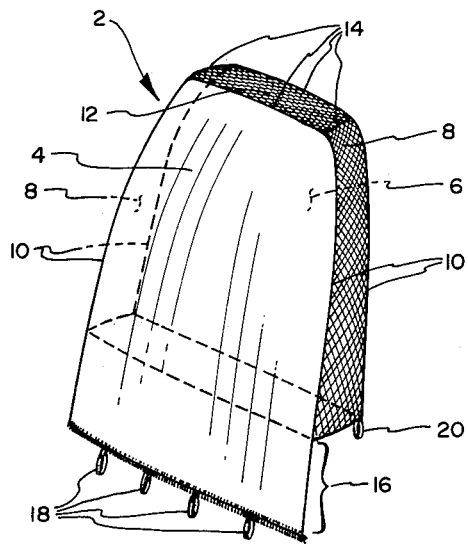
FIG. 1
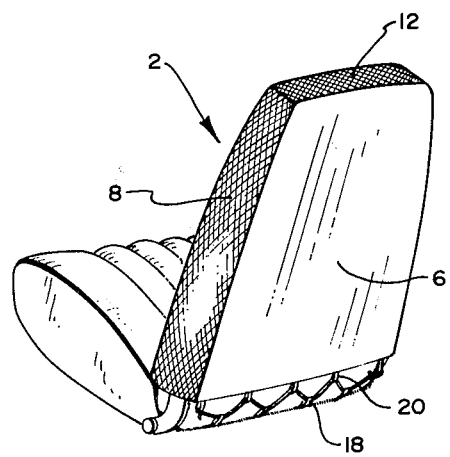
FIG. 2
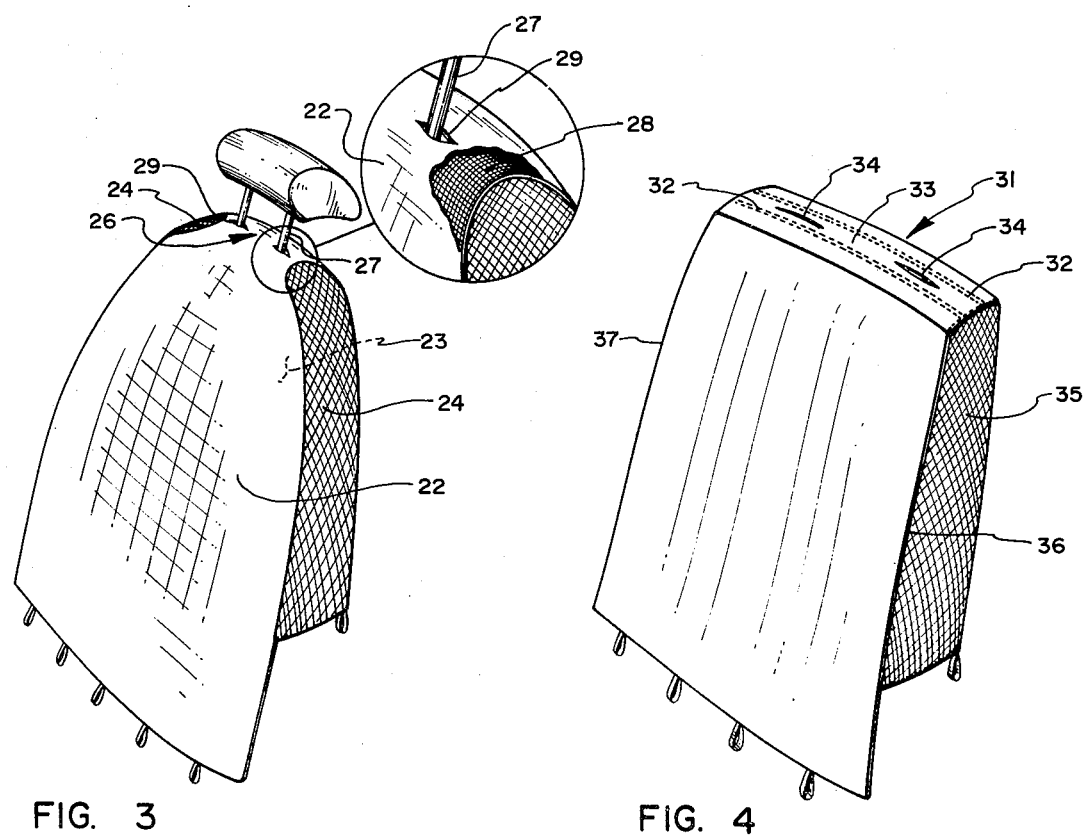
FIG. 3
FIG. 4

CONFORMABLE SEATBACK COVER

This is a continuation of application Ser. No. 806,178, filed June 13, 1977 now abandoned.

BACKGROUND OF THE INVENTION

1. Field of Invention

The present invention relates to seatback covers for vehicle-type seatbacks, and more particularly, to such seatback covers which are capable of generally conforming to different shaped seatbacks.

2. Prior Art

Despite the growing demand for replaceable seatback covers having both aesthetic appeal and durability, the bulk of manufacturers continue to utilize less than appealing synthetic fabrics, such as nylon, as the principle seatback material. One possible reason for use of this fabric may be that it can be made stretchable and thus to a certain extent form fitting.

With increased interest for aesthetic appearance, however, consumer attention has turned to heavier fabrics which are generally more attractive and appealing.

Among the materials of particular interest are the broad weave, heavy fabric styles which are especially susceptable to bright and contrasting color arrangements.

Unfortunately, such materials are not well suited for replacement seatback cover material. The bulky form and nonstretchable character have proven to be substantial obstacles to more widespread use of such material for replaceable seatback covers.

OBJECTS AND SUMMARY OF THE INVENTION

It is therefore an object of the present invention to provide a seatback cover comprising heavy-type fabric of a nonstretchable character which nevertheless is conformable to different shaped seatbacks.

It is a further object of this invention to adapt such conformable seatback covers for easy and harmless consumer modification such as for insertion of headrest accessories.

These and other objectives of the present invention are realized in one illustrative embodiment which includes front and back panels of durable, substantially nonstretchable fabric having dimensions comparable generally, with the front and back surfaces of a typical predetermined seatback configuration. The front and back panels are joined at the edges to side panels of stretchable fabric having a width somewhat less than the thickness between the front and back surfaces of the typical seatback structure. A top panel connects the top edges of the respective front, back and side panels to close the top of the seatback cover. Reinforcing material of a nonfraying character may be affixed to the top panel to enable the consumer to make the appropriate cuts therein for insertion of headrest accessories.

The use of side panels of stretchable fabric provide the desired tight-fitting, contoured form to the otherwise heavy, nonstretchable fabric of the front and back panels. With the front and back panels prestructured to conform to a typical predetermined seatback, the consumer is able to easily install his own seatback covers on seatbacks which may vary somewhat in size and shape

DESCRIPTION OF THE DRAWINGS

FIG. 1 is a side/frontal perspective view of one embodiment of a conformable seatback cover made in accordance with the principles of the present invention;

FIG. 2 shows a side/rear perspective view of the seatback cover of FIG. 1;

FIG. 3 illustrates a second embodiment of the present invention, specifically showing reinforcing material on the underside of the top panel of the seatback cover; and FIG. 4 shows a third embodiment of the present invention including reinforcing material placed over the top panel of the seatback cover

DETAILED DESCRIPTION OF THE INVENTION

Referring to FIGS. 1 and 2, a conformable seatback cover 2 as taught by the present invention comprises a front panel 4 which is composed of a durable, nonstretchable fabric material suitable for providing an aesthetic, attractive appearance. The front panel is cut to the approximate dimensions of a typical predetermined seatback configuration. Therefore, the width dimensions of the front panel will approximate the width dimensions of the front surface of the predetermined seatback extending from the base portion of the seatback to the top portion thereof.

Similarly, a back panel 6, of nonstretchable fabric, is tailored to conform to the width dimensions and surface configuration of the back surface of the typical seatback to be covered. The length of the back panel may extend from the top portion of the seatback to any desired position relative to the base portion thereof, depending on the extent of seatback surface to remain exposed on the backside thereof.

The conformable nature of the subject invention is accomplished by utilizing stretchable, relatively narrow side panels 8 to join the respective front and back panels. The side panels 8 have a width dimension somewhat less than the thickness between the front and back surfaces of the typical seatback. The stretchable character of the attached side panels provide a snug fit of the nonstretchable material to the contour of the seatback being fitted. A stitching method or other suitable means of attachment may be utilized to attach the side panel edges to the lateral edges 10 of the respective front and back panels 2 and 4.

Naturally, the relative points of attachment of the side panel to the respective front and back panels should be coordinated to result in the positioning of respective side panels at corresponding thickness locations of the seatback after the cover is in position. These relative points of attachment shall be referred to herein as corresponding lateral edges of the respective panels. The resultant seatcover body is therefore preconformed to approximate typical structures of seatbacks to be covered.

A top panel 12 is attached at the upper edges 14 of the respective front, back and side panels to completely close off the upper portion of the seatback cover. This top panel may be of stretchable fabric or may simply be a continuation of the fabric utilized for the respective front and back panels. Here again, stitching or other suitable means of attachment can be utilized to properly position the top panel.

The conformable seatback cover 2 is secured in place by means of an extended base portion 16 of the front panel 4. With the seatback cover in place, this extended portion is drawn underneath the seatback body and, utilizing securing loops 18, the front panel is laced to similar securing loops 20 connected to the back panel 6. It will, of course, be apparent that numerous methods of attachment could be utilized to obtain the single body configuration provided herein. Customarily, the front panel will have the extended portion to facilitate the positioning of the securing means in a more obscure location, thereby enhancing the aesthetic appearance.

FIG. 3 illustrates a configuration of the subject seatcover in which the front, top, and back panels are formed from a single piece of fabric. Conceptually, the top panel 26 simply represents a continuation of the front panel 22 and the back panel 23.

In view of conventional use of headrest accessories, it is desirable that the top panel be reinforced with a nonfraying type material so that the consumer may make incisions through the top panel for inserting shafts 27 for headrest accessory emplacement. FIG. 3 illustrates the location of the reinforcing material 28 underneath the top panel 26, thereby preserving the apparent continuity between the front and back panels. Utilization of the reinforcing material 28 impedes unraveling or fraying of the fabric by reason of a cut or slit 29 made in the fabric to accommodate a headrest shaft.

Such reinforcing material may be attached by means of adhesive, or may be stitched to the top panel as generally illustrated in FIG. 4. In the latter case, reinforcing material 31 may be selected from a decorative, leather-like material which is stitched to the top panel in such manner so as to preserve an open section 33 having no cross-stitching therethrough. This open section 33 would be defined by stitch lines 32 which serve to bound the open section. In this configuration, the consumer can make appropriate cuts 34 without breaking stitch lines, thereby restricting any unraveling or fraying of material.

In some cases, it may be desirable to extend the stretchable material, utilized for the side panels, to cover the back surface of the seatback instead of utilizing the unstretchable back panel previously described. As illustrated in FIG. 4, such stretchable material 35 would extend from the lateral edge 36 of the front panel around the back surface of the seatback and be attached with the other lateral edge 37 of the front panel. This configuration enables the use of the nonstretchable, more attractive material for the front panel, but gives the utility and flexibility of stretchable material around the balance of the seatcover structure.

It is to be understood that the above-described arrangement is only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A conformable vehicle-type seatback cover adapted for easy installment and removal while retaining a professionally fitted appearance conforming to selected seatback configurations, comprising:
   a. front and back panels of durable fabric having width dimensions approximating respective front and back surface widths of a selected seatback, said panels having sufficient length to extend from a base portion of said seatback to a top portion thereof with the front panel having an extended base portion to facilitate threading thereof under the seatback for attachment to the back panel;
   b. narrow side panels having width dimensions moderately less than the corresponding thickness of said seatback and constructed of a stretchable fabric, said side panels being attached at lateral edges thereof to corresponding lateral edges of said respective front and back panels, said combination of front, back and side panels forming a covering structure substantially preconformed to said seatback configurations;
   c. a top panel having dimensions sufficient to join the top edges of said front, back and side panels; and
   d. nonfraying, decorative, leather-like reinforcing material affixed over said top panel to inhibit fraying of the top panel when openings are made therein for accommodating headrests or similar seatback accessories and to enhance the appearance of the cover, the reinforcing material being stitched to the top panel with the stitching defining a central section in which openings may be made.

2. A conformable seatback cover as defined in claim 1, wherein said top panel comprises a continuation of said front and back panel fabric.

3. A conformable seatback cover as defined in claim 1, wherein said top panel comprises a continuation of said side panel fabric.

* * * * *